United States Patent [19]

Shaw

[11] Patent Number: 4,570,340

[45] Date of Patent: Feb. 18, 1986

[54] TOOL HAVING A MULTI-POSITIONAL HANDLE

[75] Inventor: Douglas N. Shaw, Castle Rock, Colo.

[73] Assignee: Houdaille Industries, Inc., Ft. Lauderdale, Fla.

[21] Appl. No.: 634,212

[22] Filed: Jul. 25, 1984

[51] Int. Cl.$^4$ .............................................. B67B 7/00
[52] U.S. Cl. .......................................... 30/123; 7/158; 16/114 R; 30/2; 30/340; 403/4; 403/403
[58] Field of Search ....................... 30/2, 134, 123, 89, 30/340; 81/177.8, 177.9, 428 R; 7/129, 131, 128, 134, 158; 16/114 R, 110 R, DIG. 41; 403/4, 403; 145/616

[56] References Cited

U.S. PATENT DOCUMENTS 721,442   2/1903   Herrick .................................. 7/134
870,678  11/1907   Henson ................................ 403/4 X Primary Examiner—Douglas D. Watts
Attorney, Agent, or Firm—Sheridan, Ross & McIntosh

[57] ABSTRACT

A tool for tightening and cutting a band clamp is provided with a separable body and handle with the body and the handle having cooperating surfaces so that the handle can be associated with the body in a plurality of different angular relationships. A connecting pin is provided for holding the handle and the body in the desired angular relationship.

10 Claims, 5 Drawing Figures

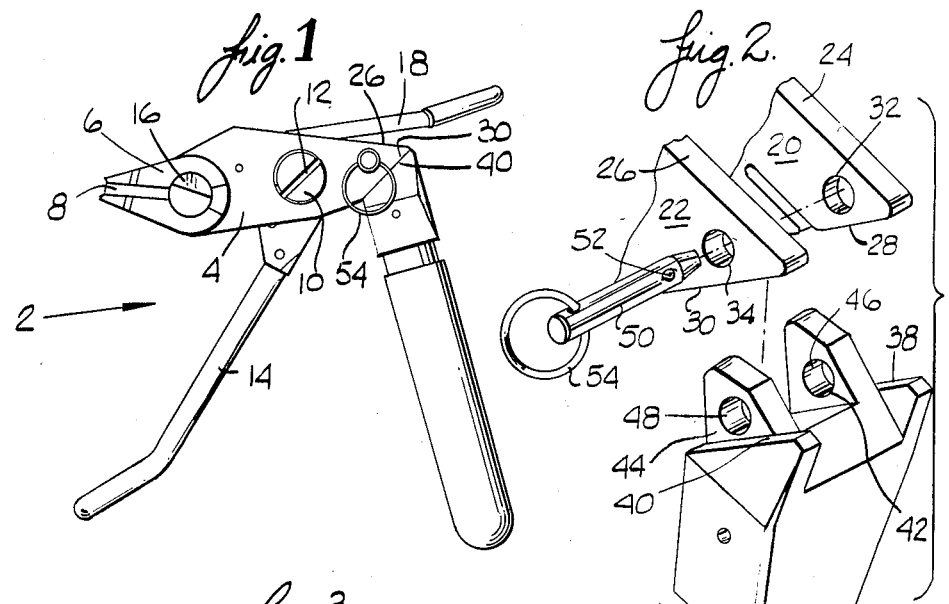
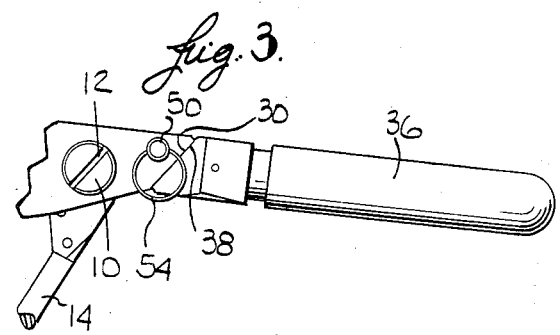
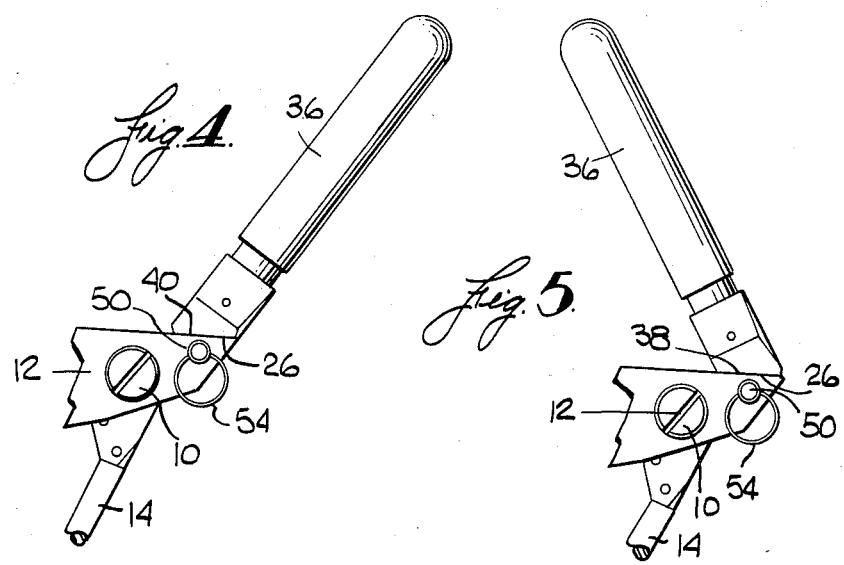

TOOL HAVING A MULTI-POSITIONAL HANDLE

FIELD OF THE INVENTION

This invention relates to the field of tightening and cutting a band clamp and more particularly to a tool for use in the tightening and cutting of the band clamp.

BACKGROUND OF THE INVENTION

It has been customary in the application of band clamps, such as attaching a flexible hose to a fitting, to use a hand held tool that is provided with means for tightening the band of the band clamp and for cutting the band when the proper tension has been attained. Many times during the use of such hand held tools, the proper operation is difficult or impossible because of obstructions encountered in the workplace. While there are instances in other fields wherein a handle may be repositioned and retained, the tools used in the tightening and cutting of band clamps have had handles in one fixed position.

BRIEF SUMMARY OF THE INVENTION

This invention provides a hand held tool for use in the tightening and cutting of a band clamp which is provided with means cooperating between the body and the handle of the tool so that the handle can be associated with the body in a plurality of different angular relationships and retained in any desired angular relationship.

In the preferred embodiment of the invention, the body of the tool is provided with a plurality of generally planar surfaces that intersect at an acute angle. The handle is provided with at least one generally planar surface. This permits the handle to be positioned relative to the body in four different angular relationships. In the more preferred embodiment of the invention, the body is provided with two spaced apart parallel projections, each of which has a plurality of generally planar surfaces that intersect at an acute angle. The handle is provided with two generally planar, spaced apart and parallel surfaces. The handle is also provided with two spaced apart and parallel lugs projecting outwardly therefrom. The lugs are provided with aligned openings and the projections are provided with aligned openings. When the openings in the lugs and the projections are in alignment, the two generally planar, spaced apart and parallel surfaces of the handle are in contact with two of the generally planar surfaces of the projections. A pin passes through the aligned openings to hold the body and the handle in the desired relationship. The pin is provided at one end with means to resist a force tending to move the pin out of its assembled condition and at its other end with means capable of being grasped so that a sufficient force may be exerted to pull the pin out of its assembled condition.

It is an object of this invention to provide a tool for use in tightening and cutting a band clamp wherein the handle of the tool may be positioned relative to the body of the tool in a plurality of different angular relationships.

Other features and advantages of the invention will be apparent from the following more particular description of preferred embodiments as illustrated in the accompanying drawings in which like reference characters refer to the same parts throughout the various views. The drawing is not necessarily to scale, emphasis instead being placed upon illustrating, the principles of the invention.

BRIEF DESCRIPTION OF THE DRAWING

FIG. 1 is a side elevation of a tool of this invention in a first angular relationship of the body and the handle;

FIG. 2 is an unassembled pictorial view of a portion of the body and the handle of the tool;

FIG. 3 is a partial side elevation illustrating a second angular relationship of the body and the handle;

FIG. 4 is a partial side elevation illustrating a third angular relationship of the body and the handle; and FIG. 5 is a partial side elevation illustrating a fourth angular relationship of the body and the handle.

DETAILED DESCRIPTION OF THE INVENTION

In FIG. 1, there is illustrated a tool 2 used for tightening and cutting a band clamp which for the most part is conventional. A body 4 is provided at one end with a first projection 6 having a slot 8 therein and through which one end of the band of a band clamp passes. A second projection 10 extends outwardly from the body 4 and is provided with a slot 12 through which the end of the band clamp passes and is then crimped over so as to remain therein. The projection 10 is rotatably mounted in the body 4. Movement of the lever 14 rotates the projection 10 so as to tighten the portion (not shown) of the band clamp that is around the object. A cutter 16 is rotatably mounted in the projection 6 so that when the proper tension has been applied, the lever 18 is moved to rotate the cutter 16 and cut the band.

The preferred embodiment of the invention is illustrated in FIG. 2 and comprises a pair of spaced apart and parallel projections 20 and 22 extending outwardly from the body 4. The projections 20 and 22 are provided with cooperating generally planar surfaces 24 and 26 and with cooperating generally planar surfaces 28 and 30. The generally planar surfaces 24 and 28 intersect to form an acute angle and the generally planar surfaces 26 and 30 intersect to form an acute angle of the same size. The acute angle between the surfaces 24 and 28 and the surface 26 and 30 is preferably between about 45 and 60 degrees. The projections 20 and 22 are also provided with aligned openings 32 and 34.

A handle 36 is provided for the tool 2. As illustrated in FIG. 2, the end portion of the handle 36 is provided with two cooperating, spaced apart and parallel generally planar surfaces 38 and 40. The generally planar surfaces 38 and 40 form an acute angle of between about 45 and 30 degrees with a transverse plane passing through the handle 36. A pair of spaced apart and parallel lugs 42 and 44 project outwardly from the handle 36 and are provided with aligned openings 46 and 48. The acute angle on the body 4 must be complimentary to the acute angle on the handle 36 so that the angular relationship illustrated in FIG. 3 can be obtained.

A pin 50 is provided and when the handle 36 and body 4 are moved into assembled position, the pin 50 is passed through the aligned openings 34, 48, 46 and 32. At one end, the pin 50 is provided with a ball 52 which is spring urged outwardly to provide resistance to moving the pin 50 out of its assembled relationship. At the other end, the pin 50 is provided with a ring 54 that may be grasped and pulled with sufficient force to overcome the resistance of the ball 52 so that the pin 50 can be removed when it is desired to change the angular relationship of the handle 36 and the body 4.

A first angular relationship between the handle 36 and the body 4 is illustrated in FIG. 1. The lugs 42 and 44 have been moved between the projections 20 and 22 until the openings 34, 48, 46 and 32 are in alignment and the surfaces 30 and 40 and the surfaces 28 and 38 are in abutting relationship. The pin 50 has been passed through the aligned openings 34, 48, 46 and 32 so as to hold the handle 36 and the body 4 in the illustrated angular relationship.

A second angular relationship between the handle 36 and the body 4 is illustrated in FIG. 3. The lugs 42 and 44 have been moved between the projections 20 and 22 until the openings 34, 48, 46 and 32 are in alignment and the surfaces 30 and 38 and the surfaces 28 and 40 are in abutting relationship. The pin 50 has been passed through the aligned openings 34, 48, 46 and 32 so as to hold the handle 36 and the body 4 in the illustrated angular relationship.

A third angular relationship between the handle 36 and the body 4 is illustrated in FIG. 4. The lugs 42 and 44 have been moved between the projections 20 and 22 until the openings 34, 48, 46 and 32 are in alignment and the surfaces 26 and 40 and the surfaces 24 and 38 are in abutting relationship. The pin 50 has been passed through the aligned openings 34, 48, 46 and 32 so as to hold the handle 36 and the body 4 in the illustrated angular relationship.

A fourth angular relationship between the handle 36 and the body 4 is illustrated in FIG. 5. The lugs 42 and 44 have been moved between the projections 20 and 22 until the openings 34, 48, 46 and 32 are in alignment and the surfaces 26 and 38 and the surfaces 24 and 40 are in abutting relationship. The pin 50 has been passed through the aligned openings 34, 48, 46 and 32 so as to hold the handle 36 and the body 4 in the illustrated angular relationship.

While the preferred embodiments of the invention have been illustrated and described herein, it may be otherwise embodied and practiced within the scope of the following claims.

What is claimed is:

1. In a band tightening and cutting tool having a body and a handle, an improvement comprising:
means cooperating between said body and said handle, wherein said handle can be associated with said body in a plurality of different angular relationships, and wherein said cooperating means comprises a plurality of generally planar surfaces on said body which intersect at an acute angle, and at least two generally planar, spaced apart and parallel surfaces on said handle;
at least two spaced apart and parallel projections extending out from said body, wherein each of said projections comprises at least two of said plurality of generally planar surfaces comprising said cooperating means, and wherein each of said projections has an opening formed therein;
at least two spaced apart and parallel lugs projecting out from said handle;
an opening formed in each of said lugs;
said openings in said lugs and said projections being in alignment and said two surfaces on said handle being in contact with two of said surfaces on said projections; and
a pin passing through said openings to hold said body and said handle in the desired relationship.

2. A tool as in claim 1 and further comprising:
means on one end of said pin for resisting a force tending to move said pin out of its assembled condition in said opening; and
means on the other end of said pin that may be grasped and pulled so that a sufficient force may be applied to remove said pin when it is desired to change the relationship between said body and said handle.

3. A tool as in claim 2 wherein:
said plurality of different angular relationships are four in number.

4. A tool as in claim 2 wherein:
acute angle is between about 45 and 60 degrees.

5. A tool as in claim 2 wherein:
said acute angle is about 55 degrees.

6. A tool as in claim 4 and wherein:
said generally planar surfaces on said handle are at an acute angle of between about 45 and 30 degrees with a transverse plane passing through said handle.

7. A tool as in claim 3 wherein:
said generally planar surfaces on said handle are at an acute angle of about 35 degrees with a transverse plane passing through said handle.

8. In a band tightening and cutting tool having a body and a handle, an improvement comprising:
first member means extending from said body, said first member means defining an outward-facing surface portion, and said surface portion comprising first and second surface areas which are substantially planar and which lie on different planes;
second member means extending from said handle, said second member means defining an outward-facing surface portion which is substantially planar and which is at an oblique angle relative to the longitudinal axis of said handle, and wherein said surface portion of said second member means can be arranged to abut against said surface portion of said first member means in at least four alternative ways which correspondingly define at least four alternative angular orientations between the longitudinal axes of said body and said handle; and
means for connecting said body to said handle in such a manner that one of said four alternative angular orientations between the longitudinal axes of said body and said handle can be maintained.

9. An improvement to a tool, as claimed in claim 8, wherein said first and second surface areas of said surface portion of said first member means are adjacent and meet at an oblique angle.

10. An improvement to a tool, as claimed in claim 9, wherein:
said first member means comprises two substantially parallel extensions which each have first and second surfaces, wherein said first surfaces of said extensions define said first surface area of said first member means, and wherein said second surfaces of said extensions define said second surface area of said first member means; and
said second member means comprises two substantially parallel projections which each have a first surface, wherein said first surfaces of said projections comprise said surface portion of said second member means.

* * * * *